United States Patent
Luo

(10) Patent No.: US 10,618,383 B2
(45) Date of Patent: Apr. 14, 2020

(54) WINDSHIELD CLIP FOR OFF-ROAD VEHICLE

(71) Applicant: Zhejiang CFMOTO Power Co., Ltd., Hangzhou, Zhejiang (CN)

(72) Inventor: Longping Luo, Hangzhou (CN)

(73) Assignee: Zhejiang CFMOTO Power Co., Ltd., Hangzhou (CN)

(*) Notice: Subject to any disclaimer, the term of this patent is extended or adjusted under 35 U.S.C. 154(b) by 85 days.

(21) Appl. No.: 15/903,413

(22) Filed: Feb. 23, 2018

(65) Prior Publication Data
US 2018/0244133 A1 Aug. 30, 2018

(30) Foreign Application Priority Data
Feb. 24, 2017 (CN) ............... 2017 2 0176327 U

(51) Int. Cl.
| | | |
|---|---|---|
| *B60J 1/00* | (2006.01) | |
| *B60J 1/02* | (2006.01) | |
| *B62J 27/00* | (2020.01) | |
| *B60R 21/13* | (2006.01) | |
| *B62J 17/04* | (2006.01) | |

(52) U.S. Cl.
CPC .......... *B60J 1/006* (2013.01); *B60J 1/025* (2013.01); *B60R 21/13* (2013.01); *B60Y 2200/20* (2013.01); *B62J 17/04* (2013.01); *B62J 27/00* (2013.01)

(58) Field of Classification Search
CPC ... B60J 1/006; B60J 1/025; B62J 17/04; B62J 27/00; B60Y 2200/20; B60R 21/13
USPC ........................................ 296/96.21
See application file for complete search history.

(56) References Cited

U.S. PATENT DOCUMENTS

| | | | |
|---|---|---|---|
| 4,087,110 A | 5/1978 | Vetter | |
| 6,663,158 B1 | 12/2003 | Showalter | |
| 6,892,427 B2 | 5/2005 | Kinzel | |
| 7,267,388 B2 * | 9/2007 | Hanson, Jr. ............. | B60J 1/06 296/77.1 |
| 7,677,646 B2 | 3/2010 | Nakamura | |
| 8,997,908 B2 | 4/2015 | Kinsman et al. | |
| 9,126,656 B2 | 9/2015 | Griffith | |
| 9,475,363 B2 | 10/2016 | Mauro | |
| 9,776,481 B2 | 10/2017 | Deckard et al. | |
| 2013/0033070 A1 * | 2/2013 | Kinsman ............. | B62D 21/183 296/190.03 |

* cited by examiner

*Primary Examiner* — Joseph D. Pape
*Assistant Examiner* — Dana D Ivey
(74) *Attorney, Agent, or Firm* — Shewchuk IP Services, LLC; Jeffrey D. Shewchuk

(57) ABSTRACT

A mounting clip having two clip portions holds a windshield to a tube of a ROPS tube of an off-road vehicle. One of the clip portions includes an arm extending in a cantilevered fashion away from the windshield contact surface, curving partially around the tube but not encircling the tube. One of the clip portions includes deflectable tabs, extending through a windshield aperture and mating into recesses on the other clip portion, so the clip can be buckled by hand pressing the two clip portions together. The windshield and the arm pinch opposing sides of the tube, compressing a seal on the edge of the windshield.

20 Claims, 4 Drawing Sheets

WINDSHIELD CLIP FOR OFF-ROAD VEHICLE

CROSS-REFERENCE TO RELATED U.S. APPLICATION(S)

None.

FIELD OF THE INVENTION

The present invention relates to attachment of windshields to metal or composite bars in roll-over protection systems in vehicles, and particularly to attachment mechanisms that can readily allow the windshield to be removed and/or replaced in offroad vehicles such as UVs and ATVs.

BACKGROUND OF THE INVENTION

In today's onroad passenger vehicles, windshields are nearly universal. The windshield deflects the wind out of the passenger compartment, and commonly seals on the bottom, sides and top of the windshield, thereby allowing a largely sealed passenger compartment. Such windshields are not intended to be optional or removeable by the vehicle owner. If the windshield is damaged, a professional windshield replacement industry exists to glue and seal a replacement windshield into place in the onroad passenger vehicle using professional windshield replacement equipment.

The situation is quite different for offroad vehicles, such as utility vehicles ("UVs") and all terrain vehicles ("ATVs"), including vehicles referred to as "side-by-sides". UVs and ATVs are intended to enable the driver and any passenger to enjoy to surrounding environment much more than possible in an onroad passenger vehicle. While some of these vehicles have no protective structure and are more open-air like motorcycles or scooters, many UVs and ATVs provide a roll cage or rollover protection system. In the UV and ATV market, the windshield may be an optional accessory for use with a permanent or semi-permanent roll cage. When desired, the windshield still provides significant wind deflection for the comfort and vision of the driver and any passenger, and also provides a significant safety feature of protecting the driver and any passenger from branches and/or airborne rocks thrown from another vehicle being followed. The windshield may also provide protection from precipitation or splattered mud.

However, many owners of UVs and ATVs, particularly those driving alone in non-wooded locations or on maintained trails, may have little desire to be enclosed behind a windshield. For those who do desire a windshield, often the windshield is subjected to much harsher conditions than seen by onroad passenger vehicles, making damage and replacement much more frequent. Accordingly, instead of gluing and sealing the windshield into place in a largely permanent manner using professional tools and equipment, UVs and ATVs may have a windshield which is readily removable and replaceable by the vehicle owner, without requiring professional windshield-replacement tools.

For example as disclosed in U.S. Pat. No. 8,997,908 incorporated by reference, retention clips may be used to secure the top and bottom of a front windshield to a roll cage. The retention clips of U.S. Pat. No. 8,997,908 attach to the roll cage with conventional fasteners such as bolts. When the windshield is removed, either the retention clip is left on the roll cage and is itself unsightly, or a bolt hole is exposed on the roll cage. Alternatively as disclosed in U.S. Pat. Nos. 6,663,158 9,475,363 and 9,776,481, all incorporated by reference, a clamping system may be used to secure the sides of a front windshield to a roll cage. The clamping systems of U.S. Pat. Nos. 6,663,158 9,475,363 and 9,776,481 are more expensive and more cumbersome than necessary, and interfere with the possibility of using doors which seal to the roll cage with and without the windshield. Better methods and structures for removably attaching a windshield to a roll cage of a UV or ATV are needed.

BRIEF SUMMARY OF THE INVENTION

The present invention is a mounting clip useful for mounting a windshield to a tube of a roll cage or roll-over protection system ("ROPS") of an off-road vehicle, as well as the windshield and the vehicle incorporating such mounting clips. The clip includes two portions which make contact with opposing faces of the windshield around an aperture in the windshield. One of the clip portions includes an arm extending in a cantilevered fashion away from the windshield contact surface, which contacts the tube but does not encircle the tube. The two clip portions join together through a male-female relationship extending through the windshield aperture, such as by hand pressing the two clip portions together such that deflectable tabs on one of the clip portions mate into recesses on the other clip portion. The windshield can be mounted relative to the tube by the clips, with the windshield and the clip pinching the tube with the windshield pressing against one side of the tube and the clip pressing against an opposing side of the tube.

Figure 1:
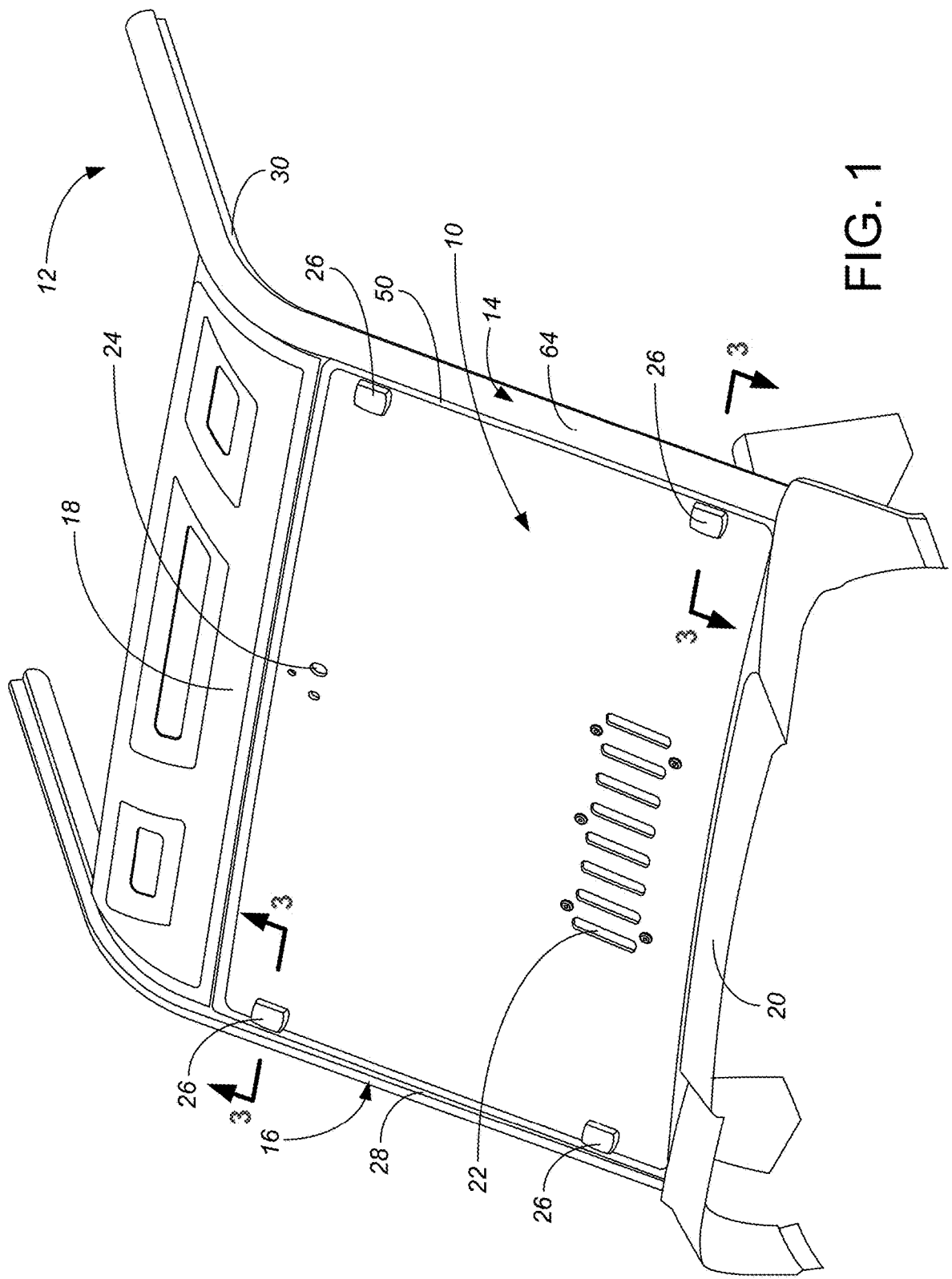
FIG. 1 is a perspective view showing a front windshield in place relative to a portion of a roll cage system, using four windshield clips in accordance with a first embodiment of the present invention to secure the windshield to a vehicle.
Figure 2:
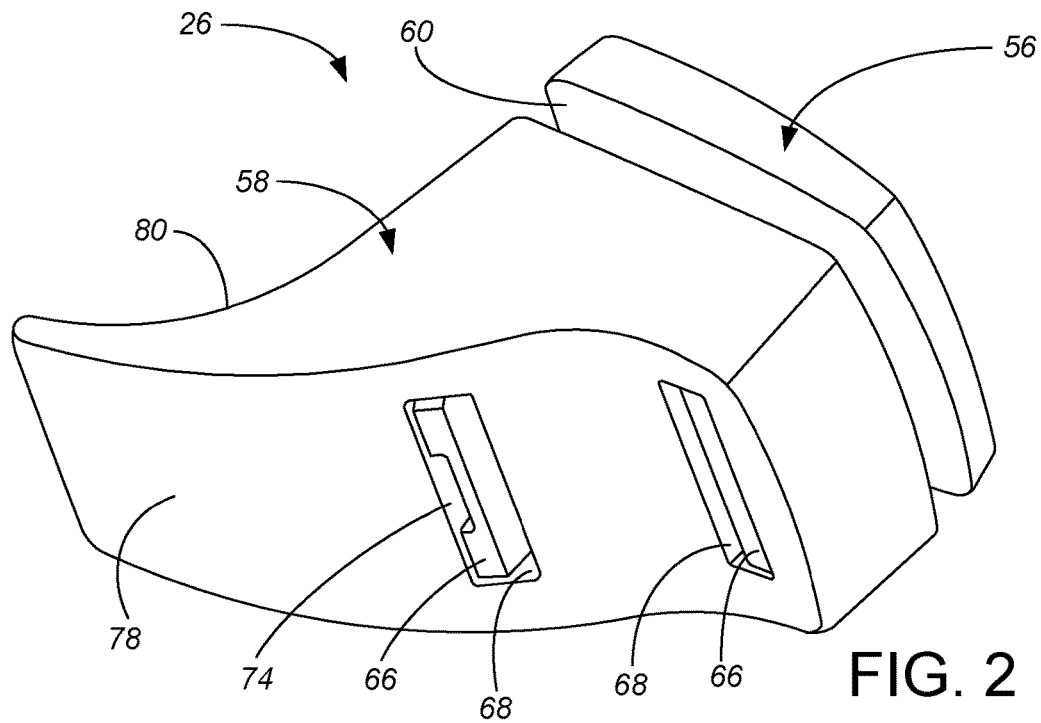
FIG. 2 is a perspective view showing the first embodiment of the present invention, four of which are used in FIG. 1.

In these drawings, the reference numerals are as follows:
windshield 10;
ROPS 12;
left A-pillar 14;
right A-pillar 16;
top cross-bar 18;
mounting base 20;
vent openings 22;
top openings 24;
clips 26;
windshield recess 28;
second recess 30;
front face 32 of the windshield recess;
side face 34 of the windshield recess;
second recess flats 36, 38;
width 40 of the windshield recess;
rear face 42 of the windshield;
leading edge 44 of the tube;
depth 46 of the windshield recess;

curved back surface 48;
seal 50;
compressible fins 52;
opening 54 for the clip through the windshield;
cap portion 56;
post-biasing portion 58;
windshield contact surface 60;
front face 62 of the windshield;
front curved portion 64 of the A-pillar tube;
tabs 66;
recess slots 68;
snap lip 70;
triangle supports 72;
detachment recess 74;
lip 76;
arm 78;
tube contact channel 80;
overhang 82; and
inside face 84 of the cap portion.

While the above-identified drawing figures set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The present invention is intended for use in mounting a windshield 10 to bars in roll cages 12 or roll-over protection systems ("ROPS") in offroad vehicles such as UVs and ATVs. FIG. 1 shows a portion of such an offroad vehicle. As known in the art, the ROPS 12 includes bars which extend up higher than the head of the driver and any passengers. In this case, the ROPS 12 includes a left A-pillar 14 and a right A-pillar 16, as well as a top cross-bar 18, though in other embodiments the top cross-bar 18 may be omitted. The windshield 10 generally extends upward from a horizontal mounting base 20 (which may or may not be formed by a cross-bar) to the top cross-bar 18, covering an elevation that enables the driver to look forward out of the vehicle, through the windshield 10 and to the travel path or trail ahead. From left to right, the windshield 10 extends from the left A-pillar 14 to the right A-pillar 16. As known in the art, while the A-pillars 14, 16 can be vertical, more commonly they are slanted, forward at the bottom and rearward at the top. The A-pillars 14, 16 may also slanted somewhat from side to side, most typically with the mounting base 20 being wider at the bottom of the A-pillars 14, 16, and with the top cross-bar 18 being narrower at the top of the A-pillars 14, 16. The horizontal mounting base 20 may be part of the vehicle frame, such as behind and supporting a hinged or removable hood (not shown) or storage compartment cover (not shown) of the vehicle. Each of the A-pillars 14, 16 and the top cross-bar 18 are typically tubular metal structures, though they may also be formed of composite materials or other strong materials to provide the strength to withstand overturning of the vehicle and protect the occupants from injury.

As known in the vehicle arts, the windshield 10 may be planar or may have a slight curvature. The windshield 10 may have several openings through it, such as a set of openings 22 for a vent (not shown) as disclosed in U.S. patent application Ser. No. 15/651,973, incorporated by reference. The windshield 10 may have other openings, such as openings 24 centered in the top of the windshield 10, which can be used for affixing a windshield wiper (not shown) or a rearview mirror (not shown) to the windshield 10.

Figure 3:
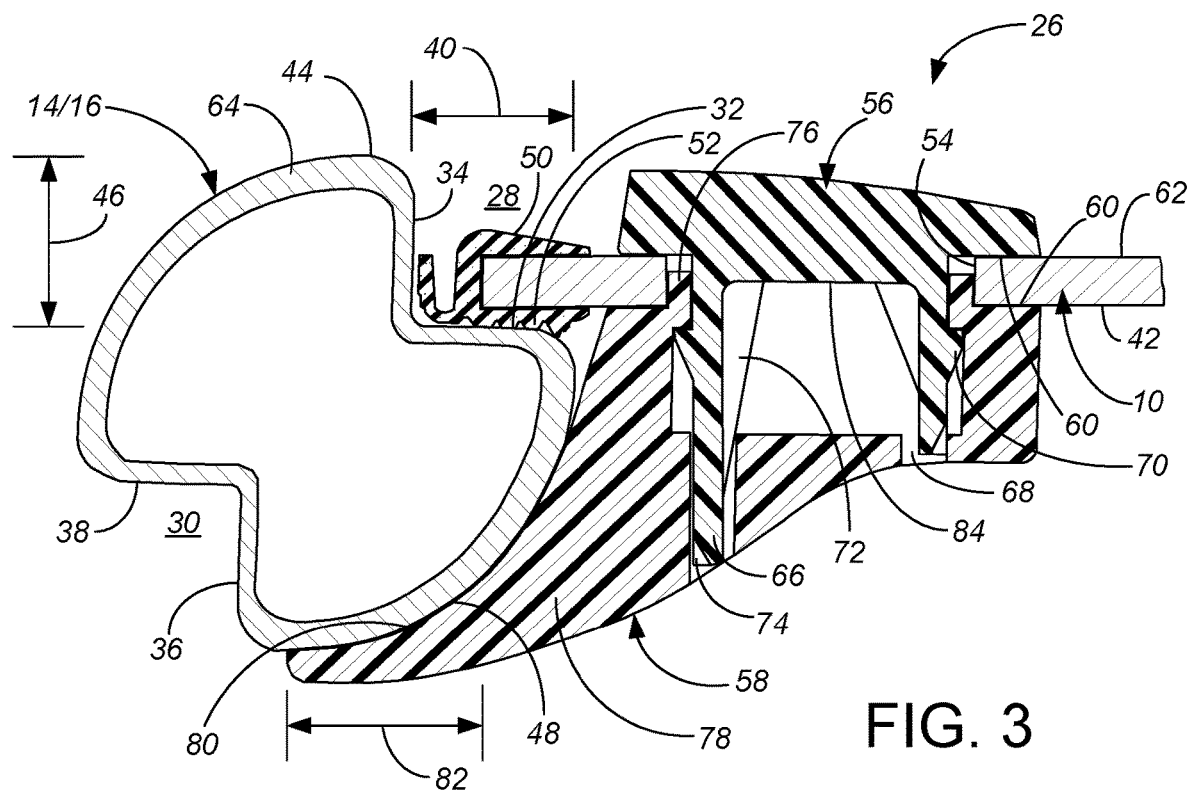
FIG. 3 is a cross-sectional view of the windshield clip of FIG. 2 in use to attach a windshield portion to an A-pillar of a roll over protection system, which could be either looking downward on the left A-pillar or looking upward on the right A-pillar of the first embodiment.
Figure 4:
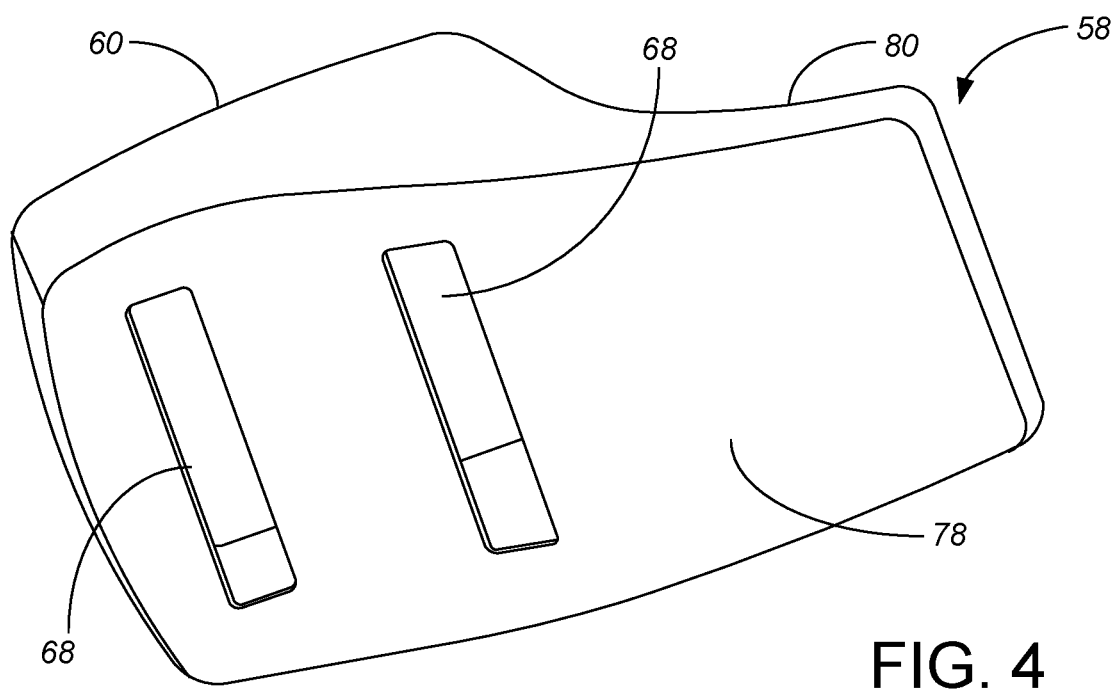
FIGS. 4 and 5 are front and rear perspective views of the hook or post-biasing portion of the windshield clip of FIGS. 1-3.
Figure 5:
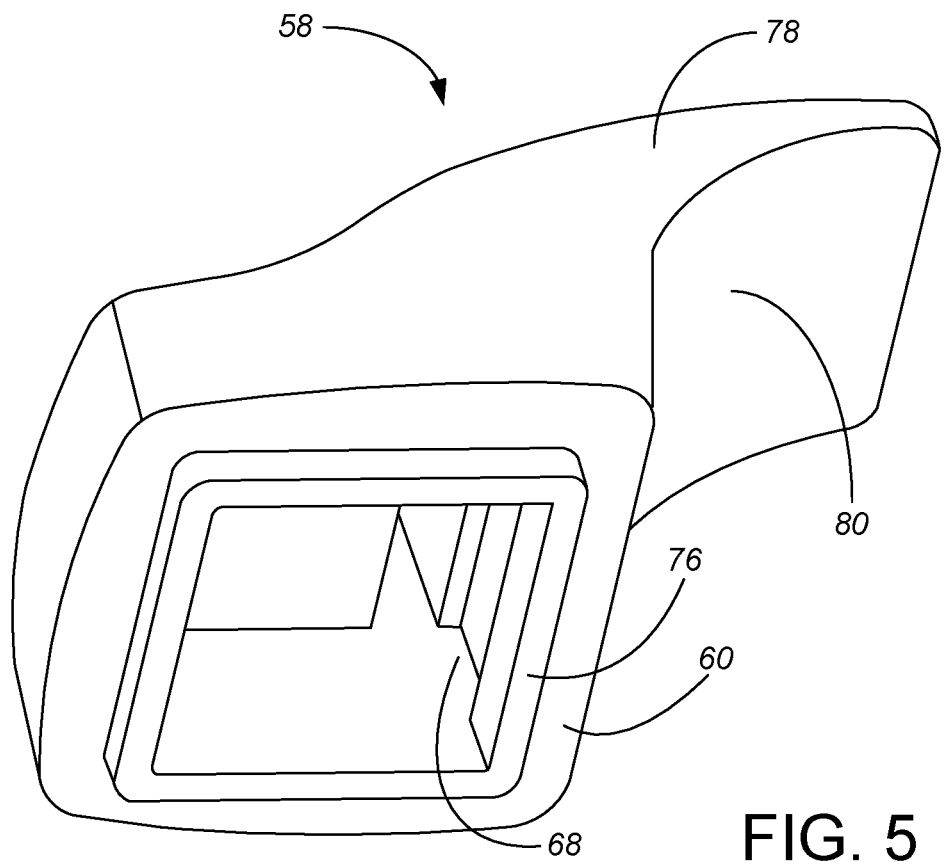
Figure 6:
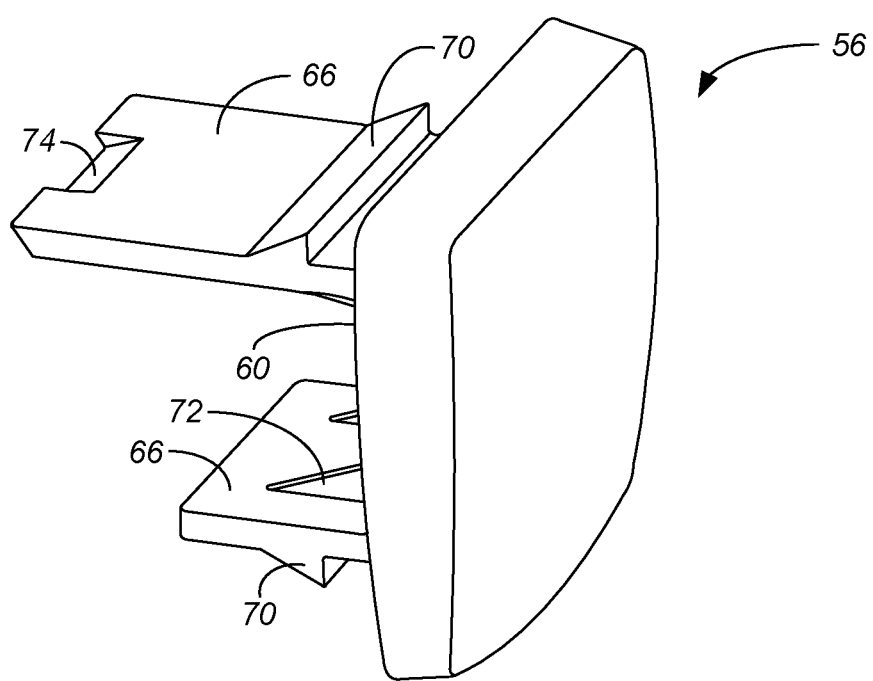
FIGS. 6 and 7 are front and rear perspective views of the clamping cap portion of the windshield clip of FIGS. 1-3.
Figure 7:
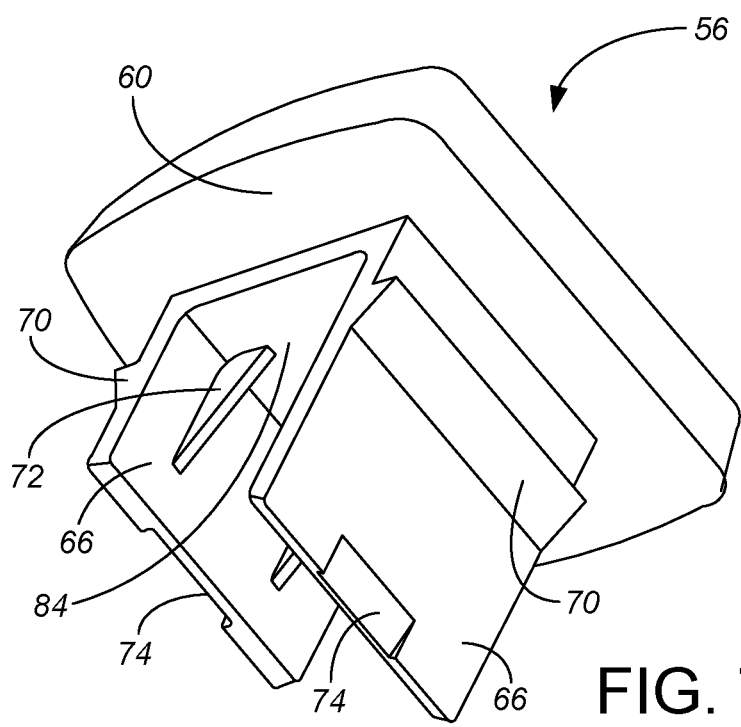

The windshield 10 is formed of a transparent or translucent material, typically having a generally uniform sheet thickness, such as within the range of 2-15 mm, with windshield thickness in the range of 4-9 mm being most common. As known in the windshield art, the windshield 10 may be formed of tempered glass, or can alternatively be formed of a rigid, transparent polymer material, such as polycarbonate or acrylic. The thickness of the windshield 10 depends on the strength and transparency properties of the material, with FIG. 3 depicting a most preferred thickness of about 6 mm. The method of forming openings through the windshield sheet material depends upon the type of material, but may be drilled or cut through the windshield material or may be directly formed such as in the mold for the sheet material.

The clips 26 of the present invention can be used on any of the sides or edges of the windshield 10, including adjacent the mounting base 20 or the top cross-bar 18. More preferably however, because the A-pillars 14, 16 are more commonly linear structures providing a range of attachment locations along their length, the clips 26 of the present invention are used on the side edges of the windshield 10 adjacent the A-pillars 14, 16. The A-pillars 14, 16 are also typically formed of robust tubes immediately adjacent the windshield 10, whereas the mounting base 20 and/or the top cross-bar 18 may be thinner or more flexible where they meet the windshield 10, or the top cross-bar 18 may not even meet the top edge of the windshield 10.

In the preferred constructions, the mounting base 20, the A-pillars 14, 16 and the top cross-bar 18 define a recess 28 extending lengthwise on the respective tube or structure which receives the edge of the windshield 10, open from the front of the vehicle so the windshield 10 can be hand placed into the recess 28. The recess 28 in the A-pillar tubes 14, 16 can be see in FIG. 1 and more clearly in FIG. 3 which shows the generally butterfly or figure "8" shape of the preferred A-pillar posts 14, 16 in cross-section. For instance, the A-pillars 14, 16 can be made of a tube similar in shape to the side frames disclosed in U.S. Pat. No. 7,677,646, incorporated by reference. This preferred shape of A-pillar tube 14/16 provides for a very strong tube, with first and second recesses 28, 30 extending lengthwise and providing flats 32, 34, 36, 38 that help in affixing and sealing other structures to the tube 14/16. In particular when considering the windshield placement and attachment, the preferred A-pillar tube shape provides a front face 32 which is generally planar so as to define an edge having a width 40 in the range of 10-30 mm for receiving the right and left edges of the windshield 10 on its rear face 42. The front planar face 32 of the A-pillar tube 14/16 is 2-30 mm deep relative to the leading edge 44 of the A-pillar tube 14/16, defining the depth 46 of the recess 28 for receiving the windshield 10. In the most preferred embodiment, the windshield recess 28 has a width 40 of about 18 mm and a depth 46 of about 18 mm.

Behind the front planar face 32, the preferred A-pillar tube 14/16 has a cylindrically curved back surface 48, with a radius of curvature as necessary for the strength and forming methods of the A-pillar tube 14/16, such as in the range of 10-80 mm. In the most preferred embodiment, the curved back surface 48 has a radius of curvature of 34 mm. In the way the preferred A-pillar tubes 14, 16 are laid out on the vehicle, the curved back surface 48 faces the interior of the vehicle.

Outside the curved back surface 48, the preferred A-pillar tube 14/16 includes a second recess 30, facing substantially the opposite direction as the recess 28 for the windshield 10, and having substantially the same size as the recess 28 for the windshield 10. In some embodiments, a door (not shown) of the UV or ATV mates into this second recess 30. In such embodiments, it is important that any added structure not interfere with any door or similar accessory mating into this second recess 30.

The windshield 10 mates into the front recess 28, abutting against the front face 32. There should be a side-to-side clearance between the windshield 10 and the outside edge 34 of the front recess 28, on both the right and left sides of the windshield 10. The clearance ensures that the recess 28 can receive the windshield 10 without interference, leaving a margin for error both in assembling the ROPS 12 and manufacturing the width of the windshield 10. The clearance also provides benefits during the various temperature conditions that the vehicle will be subjected to, in which the metal of the vehicle will typically expand and contract with a slightly different coefficient of expansion as the windshield material, preventing any binding or breaking of the windshield 10 in the recess 28 regardless of witnessed temperatures between summer and winter conditions (which can range from about −40° to 50° C.). The clearance should be small relative to the width 40 of the front face 32, thereby leaving a considerable width of the front face 32 for abutting the back side 42 of the windshield 10 along its edge. In the preferred embodiment, the nominal clearance of the windshield 10 on both the right and left sides relative to the side face 34 of the A-pillars 14, 16 is about 8 mm, leaving about 10 mm that the windshield 10 overhangs and abuts the front face 32.

A sealing structure 50 is preferably used between the windshield 10 and the A-pillar posts 14, 16. In the preferred embodiment, the seal 50 wraps all the way around the windshield 10 on its edge. The seal 50 is best seen in cross-section in FIG. 3. The seal 50 is formed of a compressible, relatively soft material, such as rubber, foam rubber, etc., arranged as a strip around the peripheral edge of the windshield 10. The seal 50 serves to protect the windshield 10 from impact and vibrations in the ROPS 12 during assembly and driving of the vehicle, particularly important to reduce wind noise, rattle and damage to the windshield 10. The seal 50 also helps to standardize the pinch force that the windshield 10 and the clip 26 place on the A-pillar tube 14/16, even if the tube thickness is slightly different from its designed thickness or slightly out of tolerance. While not overly important due to the outdoor nature of the vehicle and the fact that there are commonly many open passages for water (such as rain) to enter the cab of the vehicle, the seal 50 also preferably prevents water from passing between the windshield 10 and the A-pillar 14/16. In the most preferred embodiment, the seal 50 includes a series of compressible fins 52, with the fins 52 against the front face 32 of the A-pillar 14/16 shown compressed in FIG. 3. There is no need for the seal 50 to extend inward beyond the front face 32 of the windshield recess 28, so the preferred seal 50 is about 21 mm wide to roughly match the width of the front face 32 with a sufficient margin for error and expansion/contraction. The seal 50 may be self attaching to the windshield 10 due to the shape of the seal 50, or may be attached to the windshield 10 such as with adhesive.

At each location where a clip 26 is to be used, an opening or aperture 54 is formed through the windshield 10. The clip 26 and the windshield opening 54 are particularly designed to mate with each other in terms of the opening location (relative to the windshield edge), thickness of the windshield 10, size and shape. The opening locations should be far enough inward from the windshield edge so there is no interference with the seal 50, and further providing a separation between the seal 50 and the opening 54 so the clip 26 can contact the windshield 10 all the way around the opening 54. The opening locations should otherwise be quite close to the edge of the windshield 10. In the most preferred embodiment, the opening 54 is about 38 mm wide, centered about 43 mm from the edge of the windshield 10, thereby leaving the margin between the opening 54 and the edge of the windshield 10 at about 24 mm, and leaving about 10 mm between the opening 54 and the seal 50 as space which can be used by the clip 26.

While the opening 54 for each clip 26 could be circular (particularly if drilling is used as the method to form the openings 54), the preferred embodiment utilizes one or more flats on the opening 54, such as having a generally square opening 54 thereby providing four flat edges. By having one or more flats on the opening 54, the mating relationship between the clip 26 and the opening 54 prevents the clip 26 from spinning or rotating relative to the windshield 10, providing more consistent placement and alignment of the clips 26.

The clips 26 of the present invention detachably connect the windshield 10 to the vehicle and particularly to the A-pillar posts 14/16. Each clip 26 includes two clip portions 56, 58. The two clip portions 56, 58 can be made of a wide variety of materials to provide the desired strength, elasticity/resiliency, and hardness/deformability to hold and not damage the windshield 10 over years of use including providing the mounting force sufficient to hold the windshield 10 in place despite rigorous driving over offroad obstacles. While they could be formed of a soft metal, more preferably the clip portions 56, 58 are molded of a polymer material so as to reduce the likelihood of damage to the windshield 10. Molding the two clip portions 56, 58 of the same polymer helps reduce the cost of the clip portions 56, 58. The most preferred polymers are polypropylene and PA6 nylon.

Each clip portion 56, 58 has a windshield contact surface 60. In use, the windshield contact surface 60 of the front clip portion 56 makes contact with the front face 62 of the windshield 10, and the windshield contact surface 60 of the rear clip portion 58 makes contact with the rear face 42 of the windshield 10. In the preferred embodiments, the front clip portion 56 makes contact with the front face 62 360° entirely around the opening 54, and the rear clip portion 58 makes contact with the rear face 42 360° entirely around the opening 54. When mounted against a front face 32 of the A-pillar 14/16, the area over which the windshield contact surface 60 of the front clip portion 56 contacts the windshield 10 should be sufficient to transfer a compressive mounting force to the windshield 10, holding the windshield 10 into the recess 28 of the A-pillar 14/16. The area over which the windshield contact surface 60 of the post-biasing portion 58 contacts the windshield 10 should be sufficient to maintain the orientation of the post-biasing portion 58 as it wraps partially around the A-pillar tube 14/16. In the preferred embodiment, the windshield contact surfaces 60 of both the front clip portion 56 and the post-biasing portion 58 overlie each other with the same shape, such as generally a rectangle which is about 14 mm wider and taller than the opening 54 and generally centered on the opening 54, such that both the windshield contact surfaces 60 extend 6 mm or more past all directions of the opening 54. By having the windshield contact surfaces 60 of both the front clip portion 56 and the post-biasing portion 58 overlie each other with the same shape, not only does the clip 26 as a whole look more attractive, but the clip 26 transfers almost all of the mounting force as a compressive force, minimizing the transfer of tensile and sheer forces to the windshield 10, particularly beneficial if the windshield 10 is formed of a brittle material such as glass. Having the clip 26 as close as possible to the seal 50 also helps to minimize sheer forces within the windshield 10.

At least one of the front clip portion 56 and the rear clip portion 58 also engages the A-pillar post 14/16, and will be referred to as the post-biasing portion 58. Because (in this embodiment of the A-pillar post 14/16) the windshield receiving recess 28 has a front surface 32 with the windshield 10 received on its front, the preferred embodiment uses the rear clip portion as the post-biasing portion 58. In the preferred embodiment, the front clip portion 56 does not contact the A-pillar post 14/16, whereas in other embodiments the front clip portion contacts the front curved portion 64 of the A-pillar post 14/16. In still other embodiments, the windshield 10 is held in place on the back side of the A-pillar post 14/16, and the orientation of the clip 26 shown in FIG. 1 is reversed, i.e., the front clip portion 56 would be mounted on the rear face 42 of the windshield 10. So as to avoid confusion associated with such other undepicted embodiments, the portion of the clip 26 shown as the front portion will be referred to as the cap portion 56.

The cap portion 56 and the post-biasing portion 58 engage each other in a detachable male-female type connection extending through the opening 54 in the windshield 10. While the preferred male-female connection is encircled by the windshield sheet material, an alternative embodiment could provide the opening 54 as an indentation on the outer edge of the windshield 10, such as having the windshield sheet material wrap 270° circumferentially around the male-female connection. More preferably, the right and left edges of the windshield 10 are entirely linear and continuous inside the seal 50.

The female portion of the connection between the clip portions 56, 58 is preferably provided on the post-biasing portion 58. This places the male stud portion of the connection on the cap portion 56, and allows a lower profile to the exposed face of the cap portion 56.

If desired, the male-female connection could be made through screw threads, requiring rotation of one of the clip portions 56, 58 or a bolt within one of the clip portions 56, 58 to tighten the clip 26 onto the windshield 10. The preferred male-female connection includes at least one and more preferably a plurality of deflectable tabs 66 on the male stud portion which mate and snap into correspondingly shaped recess slots 68 on the female portion, such that the two portions 56, 58 can be joined onto the windshield 10 by a linear advance without any rotation. The most preferred embodiment includes two tabs 66. Each tab 66 includes a snap lip 70 which snaps into the recess 68 to hold the cap portion 56 to the post-biasing portion 58. The dimensions and positioning of the snap lip 70 should be small enough and far enough out on the tab 66 that the tab 66 can repeatedly elastically bend inward and snap outward, but large enough to provide a significant compressive holding force without shearing off the snap lip 70. The specific dimensions are selected based on the flexibility and strength of the material used for the male stud/cap portion 56. In the most preferred embodiment, each snap lip 70 is about 2.5 mm high, positioned about 9 mm out on the tab 66. Four triangle supports 72 can be provided, two for each tab 66. The shape and size of the triangle supports 72 are chosen to achieve the desired flexibility of each tab 66 based on the material selected for the cap portion 56. When both tabs 66 of the cap/stud portion 56 are axially advanced and snapped or buckled into the corresponding receiving recesses 68 of the post-biasing portion 58, the windshield contact surface 60 of the cap portion 56 is generally parallel to the windshield contact surface 60 of the post-biasing portion 58, spaced apart by a distance which corresponds with the thickness of the windshield sheet material, in this depicted case about 6 mm apart.

Each tab 66 also preferably includes a detachment recess 74. The preferred post-biasing portion 58 leaves the slots 68 for the tabs 66 open on the back side. By inserting a tool such as a flat blade screwdriver (not shown) and pressing against the detachment recess 74, the snap lip 70 can be deflected inward sufficiently to enable the cap portion 56 to be disengaged or unbuckled from the post-biasing portion 58, thereby detaching the cap portion 56 from the post-biasing portion 58. Alternatively, the slots 68 of the post-biasing portion 58 could be sufficiently large to provide the detachment recess.

The clip 26 preferably includes a lip 76 which contacts the inner edge of the opening 54 through the windshield 10. In the preferred embodiment, the lip 76 is provided on the post-biasing portion 58, though it could alternatively be provided on the cap portion 56 or part on the post-biasing portion 58 and part on the cap portion 56. The lip 76 helps in positioning and holding the post-biasing portion 58 during assembly with the cap portion 56. The lip 76 should be sufficiently small that it does not interfere with the desired width of the tabs 66, and in the most preferred embodiment is about 3.5 mm wide all around the opening 54. The lip 76 should not extend so far through the opening 54 so as to interfere with the windshield contacting area 60 of the cap portion 56 from making complete contact with the windshield 10. In the most preferred embodiment, the lip 76 extends about 4 mm into the opening 54, i.e., about ⅔rds of the thickness of the windshield sheet material.

The post-biasing portion 58 includes an arm 78 extending in a cantilevered fashion away from its windshield contact surface 60. The arm 78 defines a roll cage tube contact channel 80 having a corresponding shape to the rear curved portion 48 of the A-pillar tube 14/16. The width and thickness of the arm 78 along its length needs to be sufficient to support the shear force imparted in the post-biasing portion 58 to clamp the windshield 10 to the A-pillar tube 14/16. In the preferred embodiment, this is provided by tapering the thickness of the arm 78, down to a thickness of about 4 mm at its end. The arm 78 in the preferred embodiment has a width of about 50 mm.

The arm 78 wraps sufficiently around and captures enough of the ROPS 12 such that the windshield 10 can be mounted relative to the A-pillar tube 14/16 by a pinch force, pressing the rear face 42 of the windshield 10 against the front face 32 of the A-pillar tube 14/16 and compressing the seal 50 and its fins 52. Thus, how far the arm 78 extends from the windshield contact surface 60 of the post-biasing portion 58 necessarily depends on the shape of the A-pillar post 14/16. With the butterfly or figure "8" shape of the A-pillar tube 14/16 shown, the end of the arm 78 extends in a width-wise direction beyond the edge of the windshield 10, including the overhang 82. In the most preferred embodiment, this overhang 82 is about 24 mm. The overhang 82 is important, particularly when attaching to the butterfly or figure "8" shape of the A-pillar tube 14/16 shown, so the clip 26 can generate sufficient clamping or pinching force without damaging the windshield sheet material.

Because the curved back surface 48 of the A-pillar tube 14/16 faces the interior of the vehicle, the preferred clips 26 simultaneously support the windshield 10 against side-to-side motion. Whenever the vehicle moves from side-to-side, such as when cornering, the arm 78 biases off its A-pillar 14/16 pushing inward on the windshield 10. The sideways biasing force provided by the arm 78 helps to secure the windshield 10 in the windshield receiving edge recess 28. The engagement between the lip 76 and the opening 54 helps to transmit any side-to-side forces required to hold the windshield 10 in place. To ensure that the lip 76 does not deflect when imparting sideways forces on the windshield 10, the cap/stud portion fully fills the interior of the lip 76, by having an inside face 84 of the cap portion 56 which extends beyond the windshield contacting portion 60 of the cap portion 56 and within the lip 76.

Because the preferred clips 26 are so effective at holding the windshield 10 against side-to-side movement, it is not necessary for the seal 50 to contact the outside edge 34 of the first channel 28. Substantially all side-to-side mounting force of the windshield 10 is bourn by the clips 26, not by compression of the edge of the windshield 10. The clip design of the present invention is much better at adjusting to placement of the tubes 14, 16 than the windshield width, i.e., if the A-pillar tubes 14, 16 are a few millimeters closer together or further apart than designed, the clips 26 of the present invention can still hold the windshield 10 effectively in place through slight flexing of the arm 78, and without requiring a precise match between the width of the windshield 10 and the separation between the A-pillar tubes 14, 16. The curved nature of the contact between the tube contact channel 80 and the curved back surface 48 of the tube 14/16 is also important in that the post-biasing portion 28 can occupy a range of circumferential positions about the tube axis and still generate the necessary pinch force to hold the windshield 10 against the A-pillar tube 14/16 including compressing the seal 50 and its fins 52.

At the same time, the arm 78 preferably does not impede access to the second channel 30 of the roll cage tube 14/16. This leaves the entire second channel 30 open for attachment or sealing of other accessories, such as for receiving a door (not shown) on the vehicle.

Unlike prior art clips, neither of the clip portions 56, 58 extend more than 180° around the tube axis, and therefore neither clip portion 56, 58 is self-supporting on the A-pillar tube 14/16. In the preferred embodiment depicted, the arm 78 only wraps about 90° around the tube axis. To hold the clips 26 to the A-pillar tube 14/16, the windshield 10 must provide a force to the clips 26 at all times. Thus, while the location of the second channel 30 depends upon the configuration of the A-pillar tube 14/16, in one aspect the present invention involves the realization that the clips 26 of the present invention can adequately hold the windshield 10 in place—and vice versa—without having the clips 26 extend more than more than 180° around the tube axis.

The clips 26 of the present invention are simple to manufacture at low cost. The clips 26 are easy for users to install without the use of tools, merely by hand pressing the cap portion 56 into the tube-biasing portion 58. During installation, the clips 26 help to center the windshield 10 even if the user had misaligned the windshield 10 when placing the windshield 10 on the A-pillar tubes 14, 16. The clips 26 are robust and securely hold the windshield 10 in place using only the four clips 26 shown in FIG. 1, over years of use of the vehicle. For some vehicles only two clips 26 are needed. The clips 26 are easy for users to take out and remove the windshield 10 from the vehicle, using a simple flat blade screwdriver or similar tool. During storage of the windshield 10 between uses, if desired the user can reinstall the seal 50 and the clips 26 on the windshield 10 while the windshield 10 is stored such as in the user's garage or shed. Replacement of any clips 26, in case they become damaged (damage is much more common when not mounted on the vehicle), is simple and inexpensive.

Although the present invention has been described with reference to preferred embodiments, workers skilled in the art will recognize that changes may be made in form and detail without departing from the spirit and scope of the invention. For instance, while the invention has been described for use in detachably mounting a windshield to a UV or ATV, it could be used for detachably mounting a rear or side window relative to the ROPS 12, assuming the ROPS 12 provides a similar recess or surface for receiving the rear or side window. The inventive clips 26 could also be used for detachably mounting a roof of the vehicle down onto the ROPS 12, again assuming the ROPS 12 provides a similar recess or surface for receiving the roof.

The invention claimed is:

1. A mounting clip for mounting a windshield relative to a roll cage tube of an off-road vehicle, comprising:
    a first clip portion having a first clip windshield contact surface for contact with a first face of the windshield around an aperture in the windshield, the first clip portion providing an arm extending in a cantilevered fashion away from the windshield contact surface, the arm defining a roll cage tube contact channel for contacting the roll cage tube; and
    a second clip portion having a second clip windshield contact surface for contact with a second face of the windshield around the aperture in the windshield;
    the first clip portion and the second clip portion jointly comprising a male engagement mating into a female recess with the male engagement extending through the aperture in the windshield, and when the male engagement is engaged with the female recess the first clip windshield contact surface is generally parallel and spaced from the second clip windshield contact surface;
    wherein the roll cage tube contact channel can capture the roll cage tube without encircling the roll cage tube, such that the windshield can be mounted relative to the roll cage tube by a pinch force exerted between the roll cage tube contact channel and the first face of the windshield.

2. The mounting clip of claim 1, wherein, when the male engagement is linearly advanced through the aperture with the second clip portion positioned against the second face of the windshield about the aperture, the male engagement snaps into the female recess.

3. The mounting clip of claim 2, wherein the male engagement comprises at least one tab which is received into the female recess through deflection of the tab, and further comprising a detachment recess for deflecting the tab and detaching the first clip portion from the second clip portion.

4. The mounting clip of claim 1, further comprising a compressible seal pinchable between the first face of the windshield and the roll cage tube.

5. The mounting clip of claim 1, wherein at least one of the first and second clip portions have a lip extending beyond the windshield contact surface to be received within the aperture in the windshield and provide a holding force against an inside edge of the aperture in the windshield.

6. The mounting clip of claim 5, wherein the lip has at least one flat, oriented for mating with an aperture in the windshield having at least one flat.

7. The mounting clip of claim 1, wherein the roll cage tube contact channel is in the shape of a portion of a cylinder.

8. The mounting clip of claim 1, wherein the first clip windshield contact surface extends 360° around on all sides of the aperture.

9. The mounting clip of claim 8, wherein the second clip windshield contact surface extends 360° around on all sides of the aperture, with the first clip windshield contact surface being generally coextensive with the second clip windshield contact surface.

10. The mounting clip of claim 1, wherein the second clip windshield contact surface extends 360° around on all sides of the aperture.

11. The mounting clip of claim 1, wherein the first clip portion and the second clip portion are molded of polymer.

12. The mounting clip of claim 1, wherein the arm tapers in thickness.

13. A windshield having one or more clips to detachably secure the windshield relative to a roll cage of an off-road vehicle, the windshield having at least one aperture through the windshield adjacent an edge of the windshield, the windshield having an inside face and an outside face; and a mounting clip detachably secured to the windshield, the mounting clip comprising:
 a first clip portion having a first clip windshield contact surface contacting one of the inside and outside faces of the windshield around the aperture, the first clip portion providing an arm extending in a cantilevered fashion away from the windshield contact surface; and
 a second clip portion having a second clip windshield contact surface contacting the other of the inside and outside faces of the windshield around the aperture;
 the first clip portion and the second clip portion jointly comprising a male engagement mating through the aperture in the windshield into a female recess, and when the male engagement is engaged with the female recess the first clip windshield contact surface is generally parallel and spaced from the second clip windshield contact surface.

14. The windshield of claim 13, wherein the arm of the first clip portion extends with an overhang beyond the edge of the windshield.

15. The windshield of claim 13, wherein both the first clip portion and the second clip portion extend at least partially through the aperture in the windshield.

16. An off-road vehicle, comprising:
 a roll cage defining a passenger compartment in the vehicle, the roll cage also defining at least a left side and a right side of a windshield receiving edge recess;
 a windshield positioned in the windshield receiving edge recess, the windshield having at least one aperture through the windshield adjacent an edge of the windshield received in the windshield receiving edge recess, the windshield having an inside face and an outside face; and
 at least one mounting clip mounting the windshield into the windshield receiving edge recess, the mounting clip comprising:
  a first clip portion having a first clip windshield contact surface for contact with one of the inside and outside faces of the windshield around the aperture, the first clip portion providing an arm extending in a cantilevered fashion away from the windshield contact surface; and
  a second clip portion having a second clip windshield contact surface for contact with the other of the inside and outside faces of the windshield around the aperture;
  the first clip portion and the second clip portion jointly comprising a male engagement mating into a female recess with the male engagement extending through the aperture in the windshield, and when the male engagement is engaged with the female recess the first clip windshield contact surface is generally parallel and spaced from the second clip windshield contact surface;
 wherein the arm biases off the roll cage pushing inward on the windshield, with the biasing force helping to secure the windshield in the windshield receiving edge recess.

17. The off-road vehicle of claim 16, wherein the windshield receiving edge recess is at least partially defined as a channel within a roll cage tube.

18. The off-road vehicle of claim 17, wherein the roll cage tube further comprising a generally cylindrical interior-facing profile about a tube axis, wherein the arm defines a roll cage tube contact channel for contacting the generally cylindrical interior-facing profile, wherein the roll cage tube contact channel extends no more than 180° around the tube axis.

19. The off-road vehicle of claim 18, wherein the roll cage tube defines a second channel extending lengthwise on the roll cage tube, wherein the mounting clip does not impede access to the second channel.

20. The off-road vehicle of claim 16, comprising no more than four mounting clips mounting the windshield into the windshield receiving edge recess, wherein each mounting clip extends through a different aperture in the windshield, and further comprising a compressible seal pinched by the mounting clip between one of the inside and outside faces of the windshield and the roll cage tube.

* * * * *